United States Patent [19]

Stefan

[11] Patent Number: 4,911,506
[45] Date of Patent: Mar. 27, 1990

[54] DEVICE FOR STORAGE AND RETRIEVAL OF DISC-SHAPED ARTICLES

[76] Inventor: Alexander Stefan, 216 E. Arby, Las Vegas, Nev. 89119

[21] Appl. No.: 385,087
[22] Filed: Jul. 24, 1989
[51] Int. Cl.⁴ .............................................. A47F 1/04
[52] U.S. Cl. ........................................ 312/16; 312/17; 369/144
[58] Field of Search ................... 312/8, 13, 15, 16, 17, 312/18, 19; 211/40; 206/444, 445; 369/142, 144

[56] References Cited

U.S. PATENT DOCUMENTS

| | | | |
|---|---|---|---|
| 2,226,779 | 12/1940 | Roads | 312/17 |
| 2,619,966 | 12/1953 | Gallia | 211/40 |
| 2,676,859 | 4/1954 | Keltner | 312/13 |
| 3,603,460 | 9/1971 | Notes | 312/8 |
| 4,630,732 | 12/1986 | Snyman | 312/17 |
| 4,732,814 | 3/1988 | Fujino | 369/192 |

Primary Examiner—Kenneth J. Dorner
Assistant Examiner—Gerald A. Anderson
Attorney, Agent, or Firm—Charles C. Corbin

[57] ABSTRACT

A device for storing and retrieving disc-shaped articles, such as compact recording discs, and including a support frame adapted to rest on a horizontal surface and including a tiltable housing that is pivotally mounted within the support frame for limited rotation about a horizontal axis from a rest position to a dispensing position, the housing including first and second spaced apart side walls. Mounted to the tiltable housing is slotted means for storing a multiplicity of upright, side-by-side discs, and there is a multiplicity of release elements adapted to releasably hold discs mounted in storage against forward movement out of their storage locations. A disc carrier, with a through-slot for releasably holding a disc, is slidably mounted on horizontal guide means for movement from one end of the disc storing means to its other end. The carrier is alignable with any selected one of the slotted disc storage locations. A control lever, pivotally mounted to the carrier, is operable to engage the release elements to unblock the storage slot to which the carrier slot is aligned, so that, under gravitational urging a disc may roll from the carrier into the storage slot when the housing is tilted in its rest position, and out of a storage slot and into the carrier slot when the housing is tilted in its dispensing position.

11 Claims, 3 Drawing Sheets

DEVICE FOR STORAGE AND RETRIEVAL OF DISC-SHAPED ARTICLES

FIELD OF THE INVENTION

The present invention relates generally to devices for storing disc-shaped articles. More particularly, the invention relates to a device for storing a multiplicity of disc-shaped articles in dense side-by-side relationship, and for retrieving selected ones as required.

BACKGROUND OF THE INVENTION

Normally, so-called compact discs are stored in individual envelopes or hinged cases which in turn are stored in horizontal or vertical stacks. Because the overall dimensions of an encased disc is appreciably greater than the disc itself, a stack of encased discs will consume an appreciably greater volume of space than would be necessary if discs could be successfully stored in a dense, side-by-side arrangement.

It is also noted that a compact recording disc is normally removed from its case and loaded into a disc drive by hand, and returned by hand to its storage case when ejected from the drive. Such handling may impair a disc if not done very carefully.

The prior art contains examples, such as shown in U.S. Pat. No. 4,734,814, of electrically powered, automatic mechanisms for retrieving a disc and feeding it to a disc drive mechanism, however, there remains a need for a simple, manually powered device for accomplishing this. U.S. Pat. Nos. 4,630,732 and 3,603,460, disclose storage devices for a multiplicity of discs, however, these devices fail to provide, among other things, a hand-powered apparatus by which one of a multiplicity of stored discs can be retrieved from storage and fed to a drive mechanism, and then returned to storage when required, without touching the disc by hand.

SUMMARY OF THE INVENTION

In view of the foregoing it is a general object of the invention to provide a simple, efficient, and effective apparatus for storing and retrieving discs.

Another object is to provide apparatus for storing a fairly large number of disc-shaped articles in a dense, side-by-side manner.

Still another object is to provide a device for selectively and easily retrieving a disc-shaped article from amongst a densely packed multiplicity of such articles.

A further object is to provide disc storage and retrieval apparatus that requires no external power source, but which is manually operated and utilizes the force of gravity.

A still further object is to provide a manually powered device for retrieving a selected audio disc from dense storage and directly feeding it to a disc drive, and conversely, for feeding a disc from a disc drive directly to a pre-selected location in storage.

Accordingly, the aforestated goals, and additional advantage are achievable by the present invention, which is a device for storing and retrieving disc-shaped articles such as compact audio discs, which device includes a support frame adapted to rest on a horizontal surface and a tiltable housing mounted to the support frame for limited rotation about a horizontal axis from a storage configuration to a dispensing configuration. The rearward major portion of the tiltable housing has mounted therein means for supporting a multiplicity of disc-shaped articles, in a horizontally extending side-by-side close array, and including a multiplicity of disc-receiving slots. There is disc-retaining means including a multiplicity of blocking elements for releasably blocking the forward passage of an article out of the article supporting means. The invention also features a disc carrier, slidably mounted on guide means in a major forward portion of the tiltable housing, for transverse movement of the carrier across the expanse of the disc storage means. The carrier has slot means for releasably receiving and holding a disc, and this carrier slot is alignable with selectable ones of the disc-receiving slots. There is a control lever mounted to the disc carrier and it has one end that is depressible into engagement with a selected disc blocking element to create a disc-passing opening in the article support means, and to bring into alignment with that opening the disc receiving slot of the carrier. The carrier slot and the disc storage means are adapted to guide a disc to roll rearwardly under the urge of gravity when the housing rests in its storage configuration, and, when the control lever is engaged with the disc-retaining means, a disc may roll from within the carrier to the open storage location. The carrier slot and the disc storage means are also adapted to guide a disc under force of gravity in a forward direction, when the housing has been tilted to its dispensing configuration. A disc may be retrieved from any specific storage location by moving the carrier adjacent that location, engaging the blocking elements with the control lever to unblock that disc and to hold the carrier slot in alignment, and then tilting the housing to its dispensing position so that gravity will cause the selected disc to roll from storage into the carrier.

It is contemplated that the disc carrier component of the invention may be adapted to function as a disc drive.

In a preferred embodiment the multiplicity of blocking elements are slidably mounted on a horizontal support and urged together by springs means, and are adapted to be wedged apart laterally to create a disc-passing opening.

DETAILED DESCRIPTION OF THE INVENTION

Figure 1:
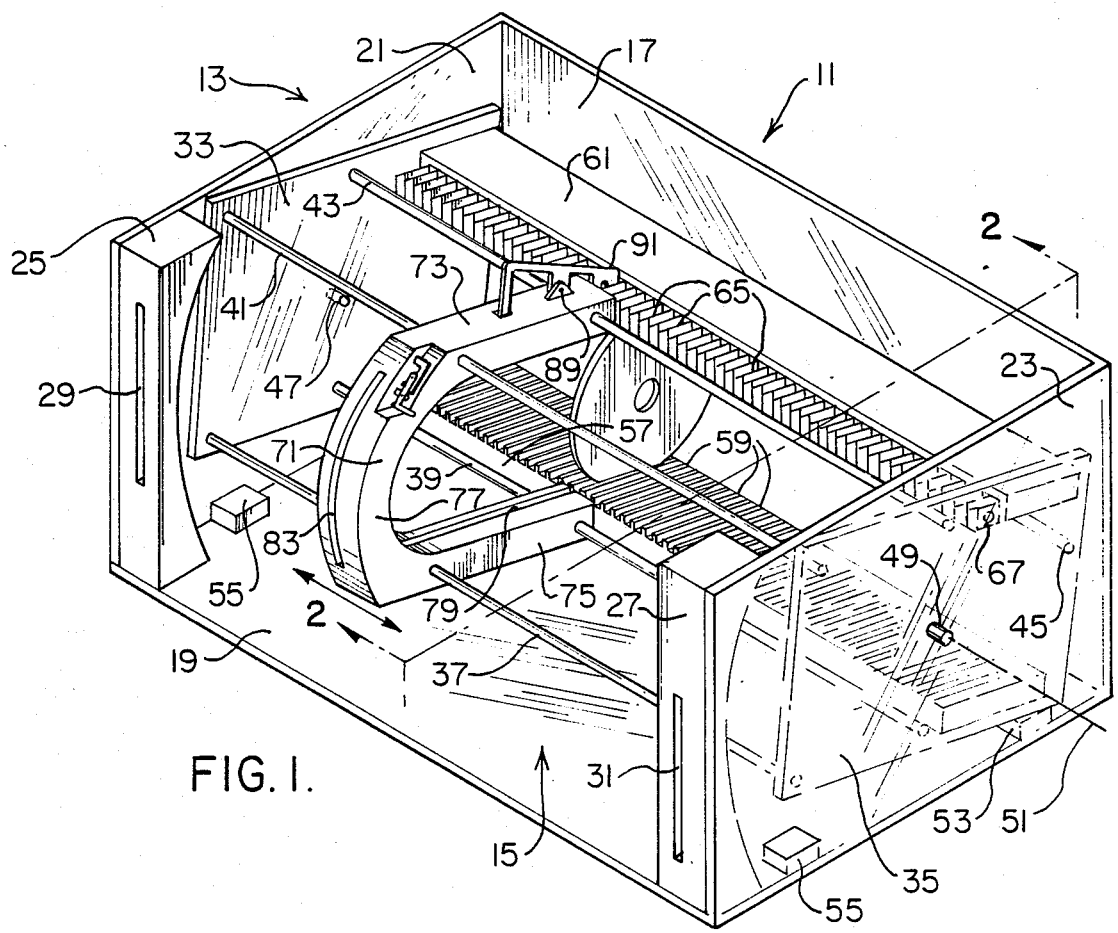
FIG. 1 is a perspective view of a preferred embodiment of the disc storage and retrieval device of the present invention.

Referring now to the drawings, FIG. 1 shows a preferred embodiment according to the invention in a storage and retrieval device 11, which includes a support frame 13 for a tiltable housing 15. Support frame 13 has a rear wall 17 and spaced-apart side walls 21 and 23. Support frame 13 also includes a first front wall segment 25 and a second front wall segment 27, each containing a disc-passing slot 29 and 31 respectively, having functions that will be described hereinafter.

Figure 2:
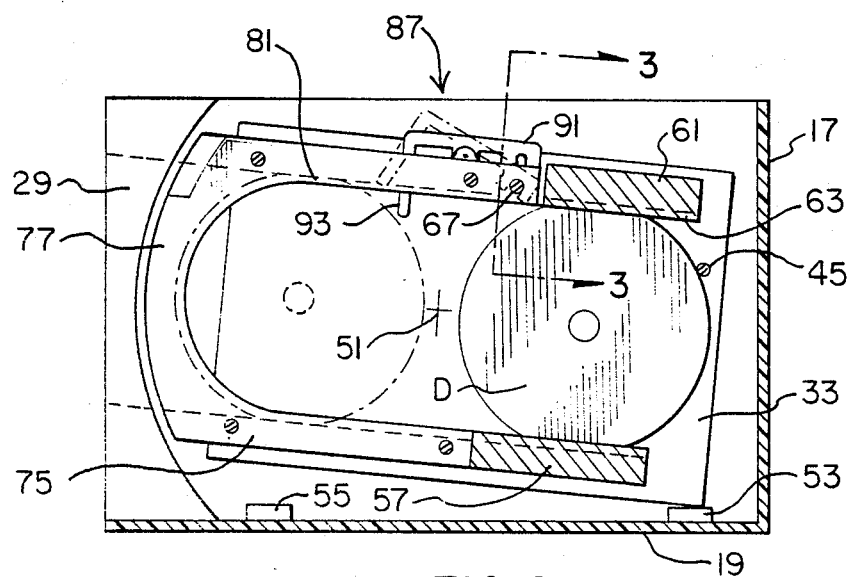
FIG. 2 is a sectional view taken along a vertical plane through the line 2—2 of FIG. 1.
Figure 5:
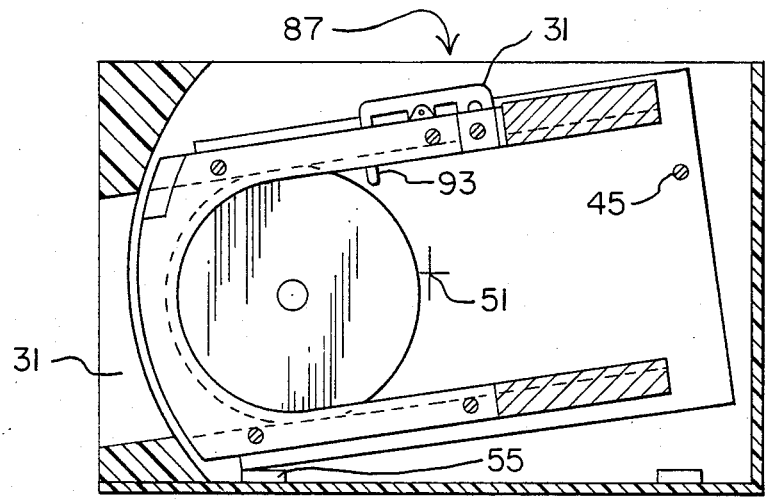
FIG. 5 is a sectional view similar to FIG. 2, showing the housing tilted away from its storage position and in its dispense position.
Figure 6:
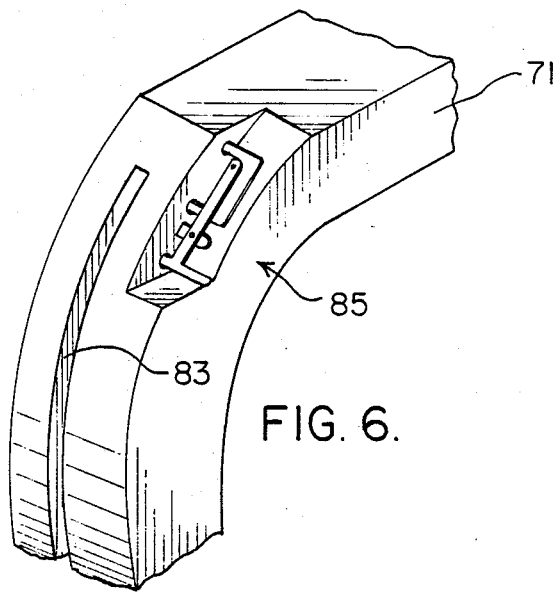
FIG. 6 is a partial, enlarged detailed view showing the disc retaining mechanism on the forward end of the carrier.

The tiltable housing 15 has a first side wall 33 and an opposing, spaced-apart wall 35, these walls being supported in their spaced apart relationship by several horizontally extending rods affixed at their ends by conventional means to side walls 33 and 34 and including the rods designated by reference numerals 37, 39, 41, 43 and 45. A pivot connection 47 mounts the housing side wall 33 to the support side wall 21, and similarly a pivot connection 49 mounts wall 35 to the side wall 23. Thus the housing 15 is mounted to the support frame 13 and is pivotable about the horizontal axis 51 that extends through the connections 47 and 49. FIG. 2 shows the rearward tilt at which housing 15 normally rests, with a bottom edge of the housing side walls abutting floor-mounted stops 53. This rest, or storage position of housing 15 is held by virtue of it deliberately being unbalanced about axis 51. FIG. 5 shows the other configuration in which housing 15 can be tilted against a gravitational bias. Thus housing 15 can be urged into this forwardly sloped configuration with lower edges of walls 33 and 35 abutting the floor mounted stops 55.

In the preferred embodiment the walls of the housing 15 and support 13 are fabricated by conventional means of rigid sheets of polymeric material, such as material sold under the trademark Plexiglass.

A lower rack 57 extends between side wall 33 and side wall 35 and is affixed thereto by suitable fastening means. A multiplicity of parallel slots 59 are provided in the upper surface of lower rack 57 and each is just wide enough to rollingly receive and support the lower peripheral portion of a disc, such as disc D shown in FIG. 2. Also affixed to side walls 33 and 35, is an upper rack 61, spaced above lower rack 57 with a multiplicity of slots 63 (not shown in FIG. 1) which are vertically aligned with lower slots 59 and dimensioned to receive upper peripheral portions of a disc D. The dividing web or spacing structure between adjoining slots 59 (and slots 63) has a minimal thickness in order to maximize the number of side-by-side discs that can be stored between the upper rack 61 and lower rack 57. The bottoms of each of the slots 59 will slope rearwardly when housing 15 rests as shown in FIG. 2, such that a disc D will be gravitationally urged against a bar stop 45. In a preferred embodiment the space between grooves is approximately one-eighth of an inch and over one hundred standard sized compact discs can be accommodated in a fairly compact device.

Adjacent the front of the upper rack 61 lies a multiplicity of release blocks 67, slidably mounted for traverse shifting on the horizontal rod 67 that has ends secured to housing walls 33 and 35.

There are enough release blocks 65 mounted to support rod 67, to frontally block all of the slots in the upper rack 61, with the thickness dimension of each block being such that each slot location has an individual block 65 aligned in front of it. A coil spring 69, shown in FIG. 3, urges the blocks 65 into contact with each other. In a manner to be described in greater detail hereinafter, the blocks 65 may be wedged apart to cause a lateral shift, which compresses the spring 69. It is further noted that the top surface of each of the blocks is inclined or contoured as shown to facilitate a camming or wedging action, to be described, that urges selected ones of blocks 65 in the direction of spring 69. The view of FIG. 2 illustrates how a lower edge of a block 65 will normally abut a forward peripheral portion of a stored disc D.

A featured component of the invention is a disc carrier 71 which is slidably mounted to horizontal, metallic rods 37, 39, 41 and 43, as illustrated in FIG. 1 and FIG. 2. This construction allows carrier 71 to be moved, as required, from a position adjacent the first wall 33 to a position adjacent the other wall 35. Carrier 71, which is designed to be grasped by hand, has an upper arm 73, a lower arm 75, and a forward portion 77, with a disc-receiving slot extending through these parts so as to provide a lower slot 79, an opposing slot 81 in the upper arm 73, and opening 83 in the forward portion 77. It will be seen that the lower carrier slot 79 is alignable with anyone of the slots 59 in the lower rack 57, with the carrier slot 81 alignable with the slots 63 and the upper rack 61. This is best shown in FIG. 2 and FIG. 5. The slot construction of carrier 71 is such that a disc placed therein will be urged by gravity to roll in a rearward direction when housing 15 is tilted in its rest, or storage position shown in FIG. 2, and will be urged to roll forwardly in a direction out of opening 83 when the housing 15 is tilted in the position of FIG. 5. However, a latch mechanism 85, to be described, will be seen to control the passage of a disc through the opening 83, and a lever 87, to be described, will be seen to control the passage of a disc in the rearward portion of the disc carrier 71.

Figure 3:
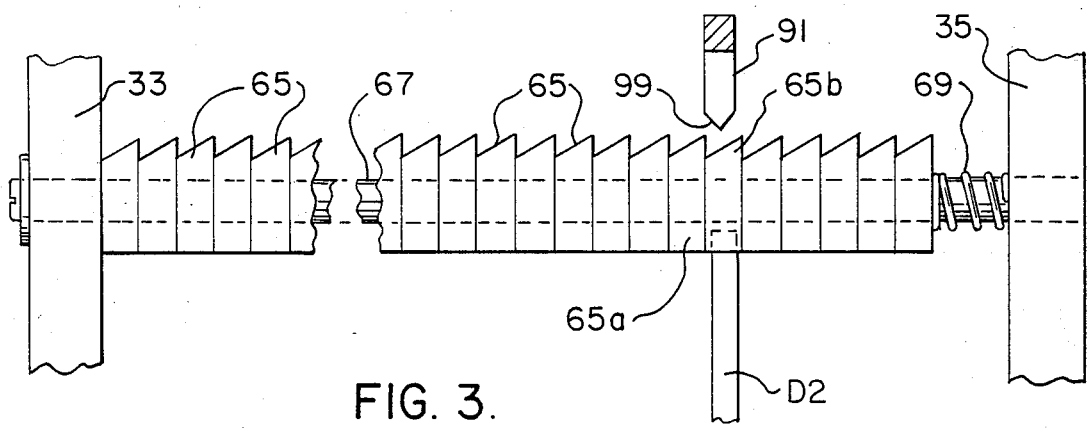
FIG. 3 is a partial, sectional view taken along the line 3—3 of FIG. 2.
Figure 4:
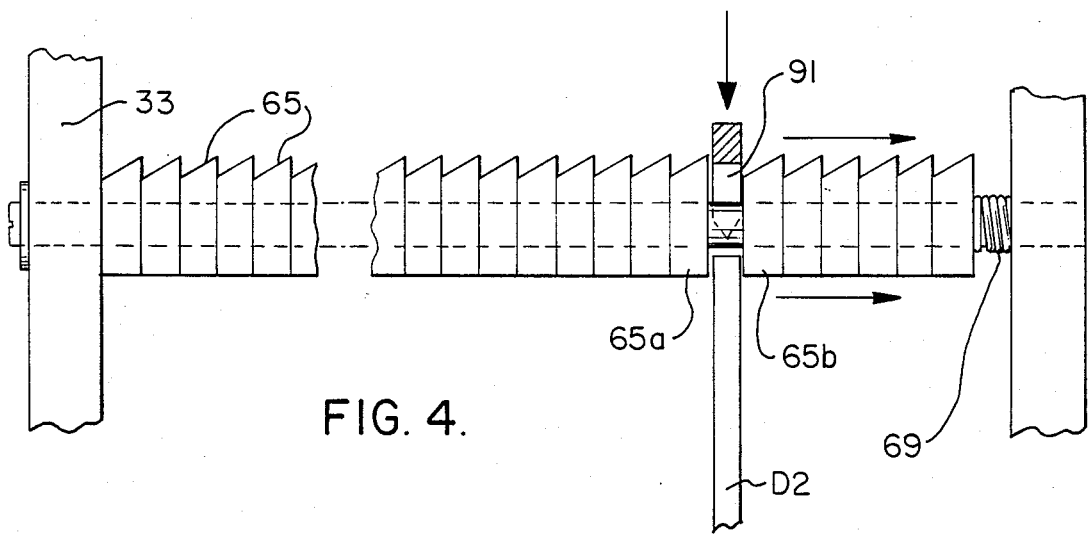
FIG. 4 is a similar view to FIG. 3, and illustrates the wedging part of the disc-blocking elements of the invention.

A control lever 87, shown in FIGS. 1, 2 and 5, is pivotally mounted at its midportion to a bracket 89 on the carrier 71. A bifurcated wedge 91 characterizes one end of lever 87, and a disc stop 93 depends from the other end of the lever 87 and extends through an opening 95. The control lever 87 has a normal position, shown in FIG. 2, in which the disc stop 93 will block rearward movement of a disc by abutting its periphery when the housing is tilted to its rest position shown in FIG. 2. The bifurcated wedge 91 has a slot 97 designed to be engaged by the rod 67 when the lever 87 is pivoted to the position shown in phantom lines in FIG. 2. In its normal position the bifurcated wedge 91 is disposed and aligned above blocks 65, as illustrated in FIGS. 2, 3 and 4. The bifurcated wedge 91 is approximately as thick as a block 65, and has a lower pointed end 99 which is contoured such that when it is brought downwardly into engagement with the upper surface of a block 65, for example the block 65b in FIG. 3, it will slidingly wedge between block 65b and the adjoining block 65a, and thereby shift the block 65b to the right as shown in FIG. 4. The fully inserted wedge 91 will be frictionally held in this down position by virtue of the squeezing force generated by spring 69, and FIG. 2 shows in phantom lines the position of the lever control 87 when its wedge end 91 is so disposed. Note as shown in FIG. 2, that end 91 lies somewhat rearwardly of the rotational axis 51 and thus when the end 91 is manually depressed the tiltable housing 15 will not be urged from its rest position. FIG. 2 also illustrates that when control lever 87 is in this engaged position, its end 93 is raised out of the confines of the upper carrier slot 81, so as to permit disc passage to and from the rearward end of carrier 71. It will be appreciated that lateral movement of wedge 91 will cause a corresponding shift in the entire carrier 71, and when the control lever is in its engaged position the upper and lower carrier slots will have been brought and held into proper alignment with the appropriate slot in upper rack 61 and the corresponding slot in lower rack 57. It is also noted that the opening created between block 65a and 65b will free the forward passage for a disc into or out of storage.

Figure 7:
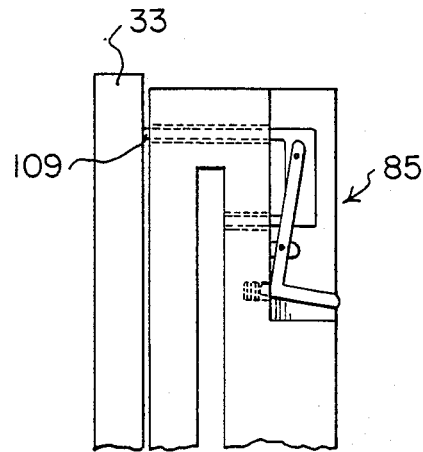
FIG. 7 is a partial frontal view, illustrating operation of the mechanism of FIG. 6.
Figure 8:
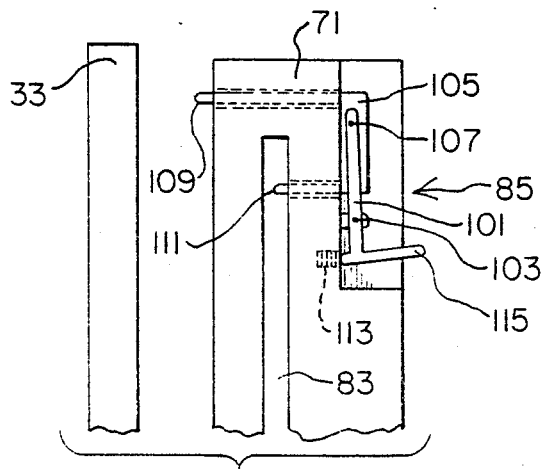
FIG. 8 is a view similar to FIG. 7.
Figure 9:
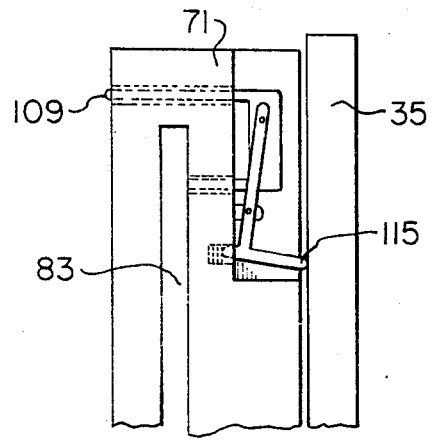
FIG. 9 is another view similar to FIG. 7.

The latch mechanism 85 mounted at the forward end of carrier 71 is designed to control passage of a disc through the carrier forward opening 83. FIG. 8 shows the normal configuration of latch 85 which includes a lever component 101 that is pivotally mounted about a fixed axis at 103, and a two-legged component 105 which is linked to lever 101 by a pin 107. The two legs of the component 105 reside in bores in the carrier and provide engaging tips 109 and 111. A coil spring 113 biases the latch 85 in its normal configuration with the tip 111 positioned to block passage of a disc through opening 83. The latch can be opened manually by depressing inwardly the lever end 115. As FIG. 7 illustrates, latch 85 can also be opened when carriage 71 is positioned adjacent side wall 33 so as to depress the tip 109. The opening 83 may also be unblocked, as illustrated in FIG. 9 by moving the carriage 71 towards the opposite wall 35 so that lever end 115 is depressed by contact with wall 35.

The front wall segment 25 of the support frame has a disc-passing slot 29 which is aligned with the carrier opening 83 as best illustrated in FIG. 2, when the carrier is positioned adjacent the housing side wall 33 as shown in FIG. 7. Note that this alignment occurs only when housing 15 is in its rest position. When carrier 71 is moved into position adjacent the other side wall, wall 35, the disc-passing opening 31, located in the front wall segment 27, is alignable with carrier opening 83 when housing 15 is tilted forward as shown in FIG. 5. Note that in each case, when carrier opening 83 is aligned with the disc-passing openings 29 and 31, the latch 85 is opened.

In the operation of the aforedescribed apparatus, a disc may be loaded into the confines of the carrier 71 by moving carrier 71 into position adjacent wall 33 and feeding a disc through slot 29 and carrier opening 83. By reference to FIG. 2, it will be appreciated that gravity will cause the inserted disc to roll rearward until it is stopped by the disc stop 93. Carrier 71 may then be moved laterally and aligned with a slot location selected to be filled. In order to facilitate the alignment of carrier 71, the top of the rack 61 may contain a visual display which designates each of the multiplicity of disc storage locations with a number, or an alphanumeric coding, for example. Once the carrier is aligned opposite the desired storage slot, the end 91 of the control lever 87 is depressed to unblock that location in the manner described above. With the tip 93 raised as illustrated in phantom lines in FIG. 2, the disc is freed to roll downwardly out of carrier 71 into a storage position in which it abuts the rod 45. With a disc thusly seated in storage the control lever 87 may be urged to its normal position. The gap between blocks 65 will then be closed, as the blocks are moved together again under the urging of spring 69. Additional discs may be loaded into storage by moving carrier 71 adjacent side wall 33 so that another disc can be inserted in the carrier via opening 29, and then carrier 71 is located opposite the desired storage location to which the disc may be delivered in the manner described above. This procedure may be repeated in order to fill all the available storage sites as desired.

In order to retrieve a particular disc, carrier 71, with control lever 87 in its normal position, is moved to bring its slot in alignment with the disc to be retrieved, with marked locations being of assistance. The tiltable housing 15 remains in its rest position during this operation. Control lever 87 may then be depressed with its wedged end 91 becoming frictionally wedged in the position shown in phantom lines in FIG. 2. By way of example, FIG. 4 illustrates the retrieval of a disc D2 when the wedged end 91 is engaged as shown to create a gap between blocks 65a and 65b, which opens a forward passage for disc D2. The housing 15 may then be tilted to the position shown in FIG. 5, which allows gravity to roll the disc from storage and into the grasp of carrier 71, where latch 85 retains it against further forward motion. While holding the housing in this tilted position the control lever 87 may be returned to its normal position, thus securing the enclosed disc against rearward motion. In one variant of the invention, a disc drive mechanism, not shown, and connected to disc playing equipment, may be incorporated in the structure of the carrier 71.

In order to remove a disc completely from the inventive device, the carrier 71 is positioned against wall 35 so that latch 85 is opened in the manner described above. When the housing 15 is tilted to the position shown in FIG. 5, with carrier slot 83 aligned with disc-passing opening 31, the disc will rollingly dispense through opening 31.

A preferred embodiment has been described and it should be appreciated by those with ordinary skill in the art, that within the scope of the invention, various changes may be made. Thus it is aimed to cover all changes as fall within the true spirit and scope of the invention.

What is claimed is:

1. Device for storage and retrieval of disc-shaped articles comprising:
   (a) support frame;
   (b) a tiltable housing pivotally mounted to said support frame for limited rotation about a horizontal axis, from a rest position to a dispense position, said housing having first and second spaced-apart side walls lying perpendicularly to said horizontal axis;
   (c) storage means, mounted in a major rearward portion of said housing for supporting upright and side-by-side a multiplicity of said articles, and including a multiplicity of article-receiving slots;
   (d) means for preventing rearward movement of articles out of said slots;
   (e) transversely extending means for releasably blocking forward passage of said articles out of said storage means and including a multiplicity of article-retaining elements;
   (f) article carrier slidably mounted in a forward portion of said housing on guide means for supporting said carrier in transverse movement across the extent of said storage means, said carrier having slot means therein for releasably holding a one of said articles, said slot means alignable with the slots of said storage means;
   (g) latch mechanism, mounted to said carrier, and movable to a first configuration in which said article-blocking means is engaged to unblock an article-receiving slot and to bring and hold said carrier slot in article-passing alignment with said unblocked slot, while opening the rearward end of said carrier slot means to the passage of an article; and (h) wherein, when said tiltable housing is in its rest position, a one of said articles carried in said carrier will roll under force of gravity from said carrier to said storage location when said mechanism is in its first configuration, and wherein when said housing is tilted to said dispense position and said mechanism is in its first configuration, one of said articles in an unblocked article-receiving slot will roll under force of gravity from storage into the embrace of said carrier.

2. Device as defined in claim 1 wherein said means for supporting a multiplicity of articles comprises slot means having article receiving slots, each of which extends in a direction parallel to said housing side walls.

3. Device as defined in claim 2 wherein said slot means comprises a lower rack having an upper surface with a multiplicity of slots therein, and an upper rack spaced above said lower rack and having slots for receiving upper peripheral portions of articles placed therein.

4. Device as defined in claim 1 wherein said housing is adapted to be biased by gravity into its rest position.

5. Device as defined in claim 1 wherein said multiplicity of retaining elements comprises a transversely extending array of blocks slidably mounted on a horizontal support and urged by spring means into contact with each other, with a portion of each block preventing forward passage of said articles stored on said device, and wherein said blocks are adapted to be engaged by said latch mechanism to laterally wedge apart said blocks to create an article passing opening.

6. Device as defined in claim 5 wherein the upper part of each block is provided with a cam-like contour, and wherein said latch mechanism comprises a pivotally mounted member having one end with a wedge-like portion for engaging said blocks.

7. Device as defined in claim 6 wherein said wedge-like end is adapted to be frictionally held in engagement with said blocks.

8. Device as defined in claim 6 wherein the wedge end of said latch mechanism lies rearward of the axis of rotation of said tiltable housing.

9. Device as defined in claim 1 wherein said carrier slot extends through the front of said carrier and said carrier has means for releasably blocking passage of an article through said carrier slot.

10. Device as defined in claim 1 wherein said carrier release is adapted to open when said carrier is brought adjacent said first side wall and when brought adjacent said second side wall.

11. Device as defined in claim 1 wherein said articles are recording discs and said carrier is adapted to drive said discs.

* * * * *